United States Patent
Chen

(10) Patent No.: US 9,878,601 B2
(45) Date of Patent: Jan. 30, 2018

(54) AUTOMOBILE TWO PULL WINDSHIELD SUNSHADE PROTECTOR SYSTEM

(71) Applicant: Yanling Chen, Bluffdale, UT (US)

(72) Inventor: Yanling Chen, Bluffdale, UT (US)

(73) Assignee: Yanling Chen, Bluffdale, UT (US)

( * ) Notice: Subject to any disclaimer, the term of this patent is extended or adjusted under 35 U.S.C. 154(b) by 9 days.

(21) Appl. No.: 15/090,658

(22) Filed: Apr. 5, 2016

(65) Prior Publication Data

US 2017/0240027 A1    Aug. 24, 2017

Related U.S. Application Data

(60) Provisional application No. 62/297,924, filed on Feb. 21, 2016.

(51) Int. Cl.
*B60J 3/02* (2006.01)

(52) U.S. Cl.
CPC ........... *B60J 3/0208* (2013.01); *B60J 3/0234* (2013.01)

(58) Field of Classification Search
CPC ...... B60J 3/0239; B60J 3/0265; B60J 3/0208; B60J 3/0204; B60J 3/0278; B60J 3/0282; B60J 7/0015
USPC .............. 296/97.11, 97.9, 85, 214, 143, 210, 296/203.03; 701/45, 1, 112, 113, 41, 36, 701/51, 49; 160/370.21, 370.22, 118, 160/201, 370.23; 362/492, 512
See application file for complete search history.

(56) References Cited

U.S. PATENT DOCUMENTS

| 4,369,996 | A | * | 1/1983 | Fluck | B60J 3/0208 160/DIG. 3 |
|---|---|---|---|---|---|
| 5,064,238 | A | * | 11/1991 | Mohtasham | B60J 1/2063 296/97.12 |
| 5,127,700 | A | * | 7/1992 | Joe | B60R 1/082 296/97.5 |
| 5,133,585 | A | * | 7/1992 | Hassan | B60J 3/02 160/370.22 |
| 5,201,563 | A | * | 4/1993 | Liao | B60J 1/2011 160/35 |

(Continued)

*Primary Examiner* — D Glenn Dayoan
*Assistant Examiner* — Sunsurraye Westbrook

(57) ABSTRACT

An automobile windshield shade system of multiple retractable sun visors is disclosed. The system includes a base, the base dimensioned to fit around an automobile sun visor and attaching thereto; a first sun visor tube, the first sun visor tube connected to the base by a first telescoping slide rail and containing a first retractable sun visor; a second sun visor tube, the second sun visor tube connected to the base by a second telescoping slide rail and containing a second retractable sun visor; and a third sun visor tube, the third sun visor tube connected to the base and containing a third retractable sun visor. The second sun visor tube extends along the second telescoping slide rail linearly to distance from the automobile sun visor. The first sun visor tube extends along the first telescoping slide rail linearly to a distance beyond the second sun visor tube. The third sun visor tube remains in a static relationship with the automobile sun visor. The system is deployed by two movements by a user. The first movement extends the first sun visor tube, which engages the second sun visor tube and extends it also. The second movement pulls the second retractable sun visor downward, bringing with it by its connection through rings to the first and third retractable sun visors.

19 Claims, 8 Drawing Sheets

(56) References Cited

U.S. PATENT DOCUMENTS

| | | | | |
|---|---|---|---|---|
| 5,472,255 A * | 12/1995 | Moore | .................. | B60J 3/0208 |
| | | | | 296/97.6 |
| 6,546,990 B2 * | 4/2003 | Peeters | ................. | B60J 7/0015 |
| | | | | 160/352 |
| 7,216,917 B2 * | 5/2007 | Tadakamalla | .......... | B60J 1/2016 |
| | | | | 296/97.11 |
| 7,722,109 B1 * | 5/2010 | McGehee | .............. | B60J 3/0208 |
| | | | | 296/97.6 |

* cited by examiner

AUTOMOBILE TWO PULL WINDSHIELD SUNSHADE PROTECTOR SYSTEM

FIELD OF THE INVENTION

This invention relates to the field of automobile windshield sun protector. More specifically, the invention comprises a windshield sun protector which allows a two step process to expand and collapse.

BACKGROUND OF THE INVENTION

There are many known kinds of automobile windshield sun protectors in the market. All of them have one or more of the following design shortcomings. In some designs, installation requires drilling holes or the use of adhesives which results in irreversible damage to the automobile, such as disclosed in U.S. Pat. No. 5,653,278. Windshield sun protectors are often cumbersome and difficult to deploy and store, such as U.S. Pat. No. 5,649,584. More problems occur when installed sun protectors partially block a driver's front view, creating a dangerous condition, such as disclosed in U.S. Pat. No. 5,653,278.

Thus, there is a heartfelt need for an automobile windshield sun protector that can be installed without damaging the vehicle and easily deployed, and does not obstruct the driver's front view when not in use.

SUMMARY OF THE INVENTION

The present invention solves the problems described above by providing an automobile windshield shade system having multiple retractable sun visors. The system includes a base, the base dimensioned to fit around an automobile sun visor and attaching thereto; a first sun visor tube, the first sun visor tube connected to the base by a first telescoping slide rail and containing a first retractable sun visor; a second sun visor tube, the second sun visor tube connected to the base by a second telescoping slide rail and containing a second retractable sun visor; and a third sun visor tube, the third sun visor tube connected to the base and containing a third retractable sun visor. The second sun visor tube extends along the second telescoping slide rail linearly to distance from the automobile sun visor. The first sun visor tube extends along the first telescoping slide rail linearly to a distance beyond the second sun visor tube. The third sun visor tube remains in a static relationship with the automobile sun visor. The system is deployed by two movements by a user. The first movement extends the first sun visor tube, which engages the second sun visor tube and extends it also. The second movement pulls the second retractable sun visor downward, bringing with it by its connection through rings to the first and third retractable sun visors.

In one aspect, the present invention provides a windshield shade, having a base, the base dimensioned to fit around an automobile sun visor and attaching thereto; a first sun visor tube, the first sun visor tube connected to the base by a first telescoping slide rail and containing a first retractable sun visor; a second sun visor tube, the second sun visor tube connected to the base by a second telescoping slide rail and containing a second retractable sun visor; and a third sun visor tube, the third sun visor tube connected to the base and containing a third retractable sun visor; wherein the second sun visor tube extends along the second telescoping slide rail linearly to distance from the automobile sun visor; wherein the first sun visor tube extends along the first telescoping slide rail linearly to a distance beyond the second sun visor tube; and wherein the third sun visor tube remains in a static relationship with the automobile sun visor.

In an embodiment, the windshield shade also includes a counter weight. The second sun visor is connected to the counter weight, and the counter weight is connected to first ring connecting the second sun visor to the first sun visor and to a second ring connecting the second sun visor to the third sun visor. In an embodiment, the first sun visor has a first tail handle, the second sun visor has a second tail handle, and the third sun visor has a third tail handle. In an embodiment, the counterweight is attached to the second tail handle. In an embodiment, the second tail handle is connected to the first tail handle by a first ring. In an embodiment, the second tail handle is connected to the third tail handle by a second ring. In an embodiment, the first sun visor tube and second sun visor tube are engaged by a first trigger and a second trigger wherein when the first trigger and second trigger are brought into contact with each other the second sun visor tube is extended from the base along the second slide rail.

In an embodiment, the first sun visor tube and second sun visor tube are engaged by a third trigger such that when the third trigger is brought in contact with the first trigger, the second sun visor tube is retracted to the base along the second slide rail. In an embodiment, the first telescoping rail has three sections. In an embodiment, the second telescoping rail has two sections.

In an embodiment, the base includes at least one attachment screw, the attachment screw fastening the base to the automobile sun visor.

In an embodiment, the base is attached to the automobile sun visor on the passenger side of a vehicle.

In an embodiment, the first sun visor, second sun visor, and third sun visor are self-locking.

In another aspect, the present invention provides a method of deploying an automobile windshield shade having the steps of: attaching to an automobile sun visor a base having first, second, and third sun visor tubes, respectively containing a first retractable sun visor having a first tail handle extending along the length of the bottom edge of the first sun visor, a second retractable sun visor having a second tail handle extending along the length of the bottom edge of the second retractable sun visor, a third retractable sun visor having a third tail handle extending along the length of the bottom edge of the third retractable sun visor, wherein the first, second, and third tail handles are connected to each other by first and second rings, wherein the first ring connects the right end of the first tail handle with the left end of the second tail handle, and where the second ring connects the right end of the second tail handle to the left end of the third tail handle; in a first motion, extending the first sun visor tube and the second sun visor tube away from the base along sliding rails attached to the base to first and second extended positions, wherein the first sun visor tube engages and extends the second sun visor tube when the first sun visor tube is extended; and in a second motion, extending the second retractable sun visor from the second sun visor tube, and, by connection by the first and second rings extending the first, second, and third retractable sun visors from the first, second and third sun visor tubes.

In an embodiment, extending the first sun visor tube brings into contact a first trigger on the first sun visor tube with a second trigger on the second sun visor tube, thus extending the second sun visor tube. In an embodiment, extending the second retractable sun visor comprises grasping a counter weight attached to second tail handle and pulling it downward.

In still another aspect, the present invention provides a method of retracting an automobile windshield shade having the steps of: attaching to an automobile sun visor a base having first, second, and third sun visor tubes, respectively containing a first retractable sun visor having a first tail handle extending along the length of the bottom edge of the first sun visor, a second retractable sun visor having a second tail handle extending along the length of the bottom edge of the second retractable sun visor, a third retractable sun visor having a third tail handle extending along the length of the bottom edge of the third retractable sun visor, wherein the first, second, and third tail handles are connected to each other by first and second rings, wherein the first ring connects the right end of the first tail handle with the left end of the second tail handle, and where the second ring connects the right end of the second tail handle to the left end of the third tail handle; in a first motion, retracting the second retractable sun visor into the second sun visor tube, and, by connection by the first and second rings retracting the first, second, and third retractable sun visors into the first, second and third sun visor tubes; and in a second motion, retracting the first sun visor tube and the second sun visor to the base along sliding rails attached to the base to first and second retraced positions, wherein the first sun visor tube engages and retracts the second sun visor tube when the first sun visor tube is retracted.

In an embodiment, retracting the first sun visor tube brings into contact a first trigger on the first sun visor tube with a third trigger on the second sun visor tube and retracts the second sun visor tube to the base. In an embodiment, retracting the second retractable sun visor comprises unhooking a counter weight attached to second tail handle.

Many additional features and advantages of the present invention will be realized by one skilled in the art upon reading the following description, when considered in conjunction with the drawings.

DETAILED DESCRIPTION OF THE INVENTION

Figure 4:
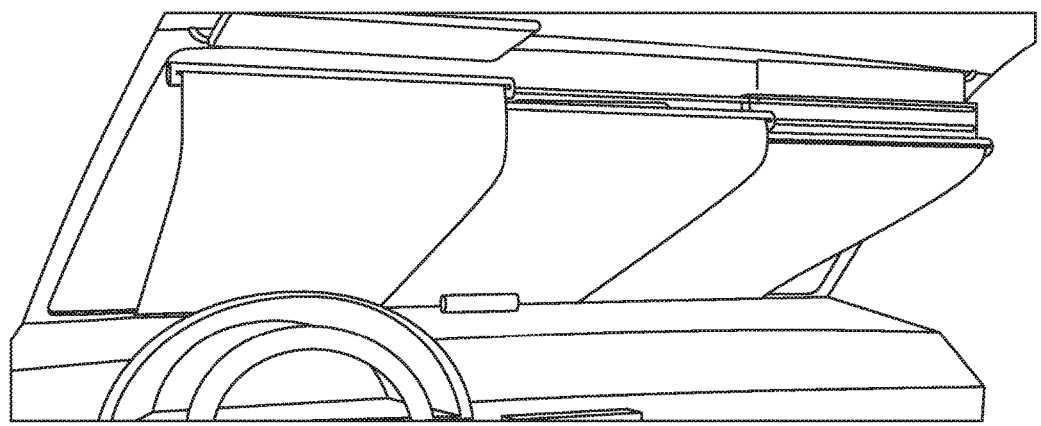
FIG. 4: A perspective view of the system when fully deployed.

Directing attention to the FIGS, the sunshade protector system, shown herein in FIGS. 1-10, is assembled on base 2, which is secured to passenger sun visor 1 by two hand-tightened knobs 3. The user, typically a driver of the vehicle to which the present invention is attached and operated as a plurality of retractable sunshades for an automobile windshield, places base 2 on the passenger sun visor 1. Installation does not require any tools and does not cause any damage to sun visor 1. While illustrated and described herein as being used near the front windshield of an automobile, substituting suction cups for knobs 3 allows the sunshade protector system to be used on the rear window of an automobile. The system is easy to expand and retract. To expand and deploy the sunshades, the user pulls the first roll-up sunshade visor, sun visor tube 4, all the way from the passenger side of the windshield to the driver side of the windshield, as shown in a transition from FIG. 1, then to FIG. 2, and then to FIG. 3. Counter weight 21 is then hooked on second sun visor tail handle 11 and left on the front dashboard as shown in FIG. 4. Thus, only two steps are necessary to fully expand the sunshade protector system of the present invention.

Figure 1:
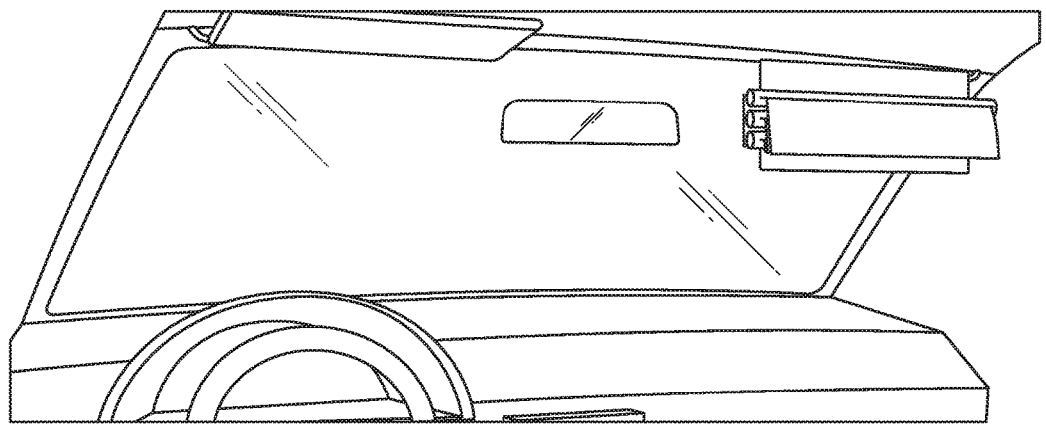
FIG. 1: A perspective view of the system when installed and completely packed up.
Figure 2:
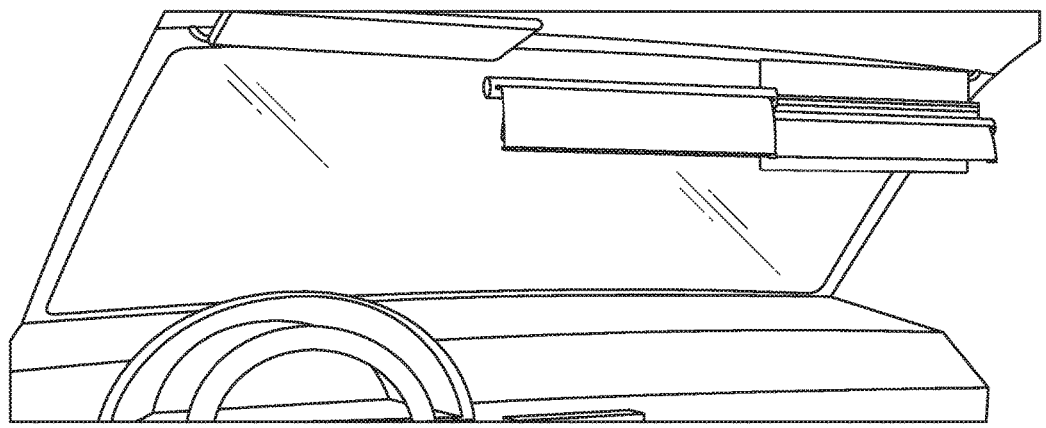
FIG. 2: A perspective view of the system when partially and horizontally extended and partially deployed.
Figure 3:
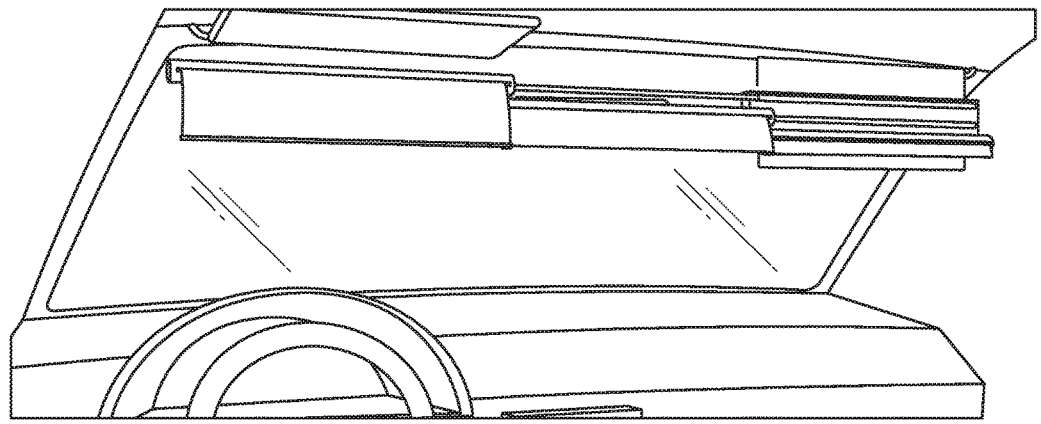
FIG. 3: A perspective view of the system when fully and horizontally extended and partially deployed.

To retract the sunshade protector, the user releases counter weight 21 from the second sun visor handle 11. In an embodiment, sun visors tubes 4, 5, 6 are spring-loaded to automatically retract their respective sun visors. Then the first sun visor tube 4 is pushed all the way back to passenger sun visor 1, as shown in FIG. 1. Only two steps are required to fully pack up the sunshade protector. The retraction process can be viewed as transitioning from FIG. 4, to FIG. 3, to FIG. 2, and finally back to FIG. 1.

The entire system is placed on the base 2. The base is mounted on the passenger sun visor 1 by two hand tightened mounting knobs 3.

Figure 5:
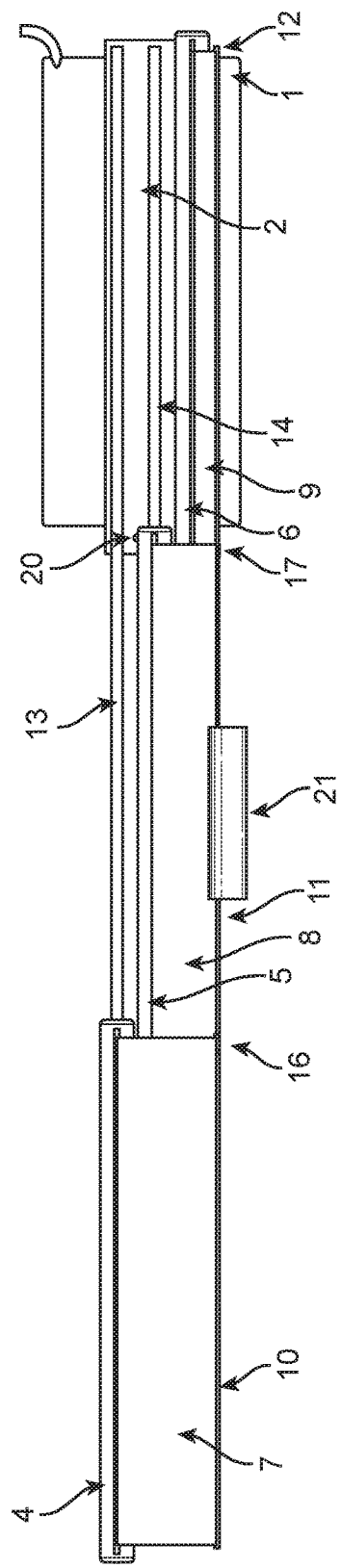
FIG. 5: A front view of the system (inside the vehicle) when fully and horizontally extended and partially deployed.

As shown in FIG. 5, there are three substantially parallel, automatic roll up sun visor tubes 4, 5, 6 that are similar in size and dimension. Each of the sun visor tubes 4, 5 and 6 have lengths that are about the same dimension as the width of passenger sun visor 1. Sun visor tube 4 is connected to base 2 by a three-step telescopic slide rail 13. Sun visor tube 5 is connected to base 2 by two-step, telescopic slide rail 14. Sun visor tube 6 is connected to base 2 by a rubber connector 15.

In an embodiment, both slide rails 13, 14 have lengths similar to the lengths of sun visor tubes 4, 5, 6. Both slide rails 13, 14 prevent themselves from sliding into separate pieces. In an embodiment, slide rails 13, 14 include a retaining clip that engages when the slide rails 13, 14 are retracted, which prevents slide rails 13, 14 from sliding out while driving.

Figure 6:
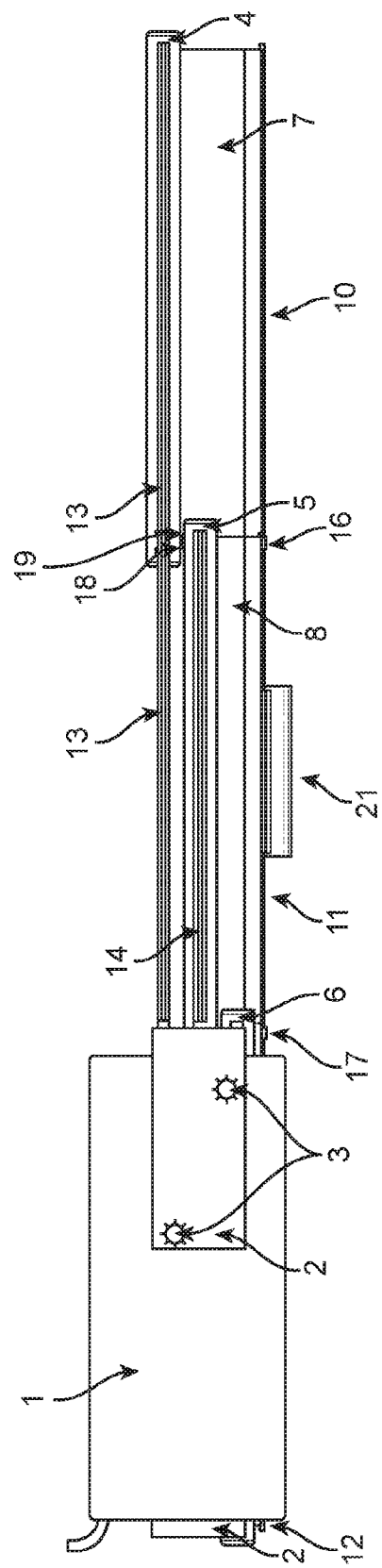
FIG. 6: A back view of the system (in front of the vehicle) when fully and horizontally extended and partially deployed.

As shown in FIG. 6, from the view of the opposite side of sun visor 1, in an embodiment, sun visor tubes 4, 5 are partially connected by a group of triggers 18, 19, 20. When pulling sun visor tube 4 to driver side, bottom trigger 18 pulls sun visor tube 5 out by coming into contact with and engaging top trigger 19. When pushing first sun visor tube 4 back to the passenger side, bottom trigger 18 pushes the sun visor tube 5 back to the passenger side by top trigger 20. Use of triggers 18, 19, 20 enables a user to horizontally fully expand and retract the system by simply pulling or pushing the first sun visor tube 4.

Also, in an embodiment, each of the three sun visors has a tail handle 10, 11, 12. The first sun visor handle 10 and the second sun visor handle 11 are connected by a ring 16. The second sun visor handle 11 and the third sun visor handle 12 are connected by another ring 17. The ring 16 can horizontally move on the handles 10 and 11. The ring 17 can horizontally move on the handles 11 and 12. The counter weight 21 causes sun visor 8 to be pulled out sun visor tube 5. The second sun visor handle 11 will pull the first sun visor handle 10 and the third sun visor handle 12 its connection to them by rings 16, 17. This can be more clearly seen in FIG. 7, described below.

In an embodiment, three sun visor tubes are used and each sun visor tube is about the same width as the passenger sun visor. This design works for most automobiles as automobile windshield internal width is about three times as the passenger sun visor width. However, the present invention can utilize four, or even more, sun visor tubes in a similar configuration as shown to apply it to wider vehicles or longitudinally in buses and recreational vehicles.

In an embodiment, the three sun visor tubes 4, 5, 6 can also be embodied as self-locking sun visor tubes. Self-locking sun visor tubes having internal locking mechanisms that are similar to the internal locking mechanisms found in manual pull out projector screens. The user can pull out the sun visor and lock it at any position. To retract the sun visor, the user only needs to slightly pull the sun visor to unlock and a spring-loaded retraction mechanism retracts the sun visor. In such embodiments, the counter weight item 21 is not needed for keeping the sun visor extended.

Figure 7:
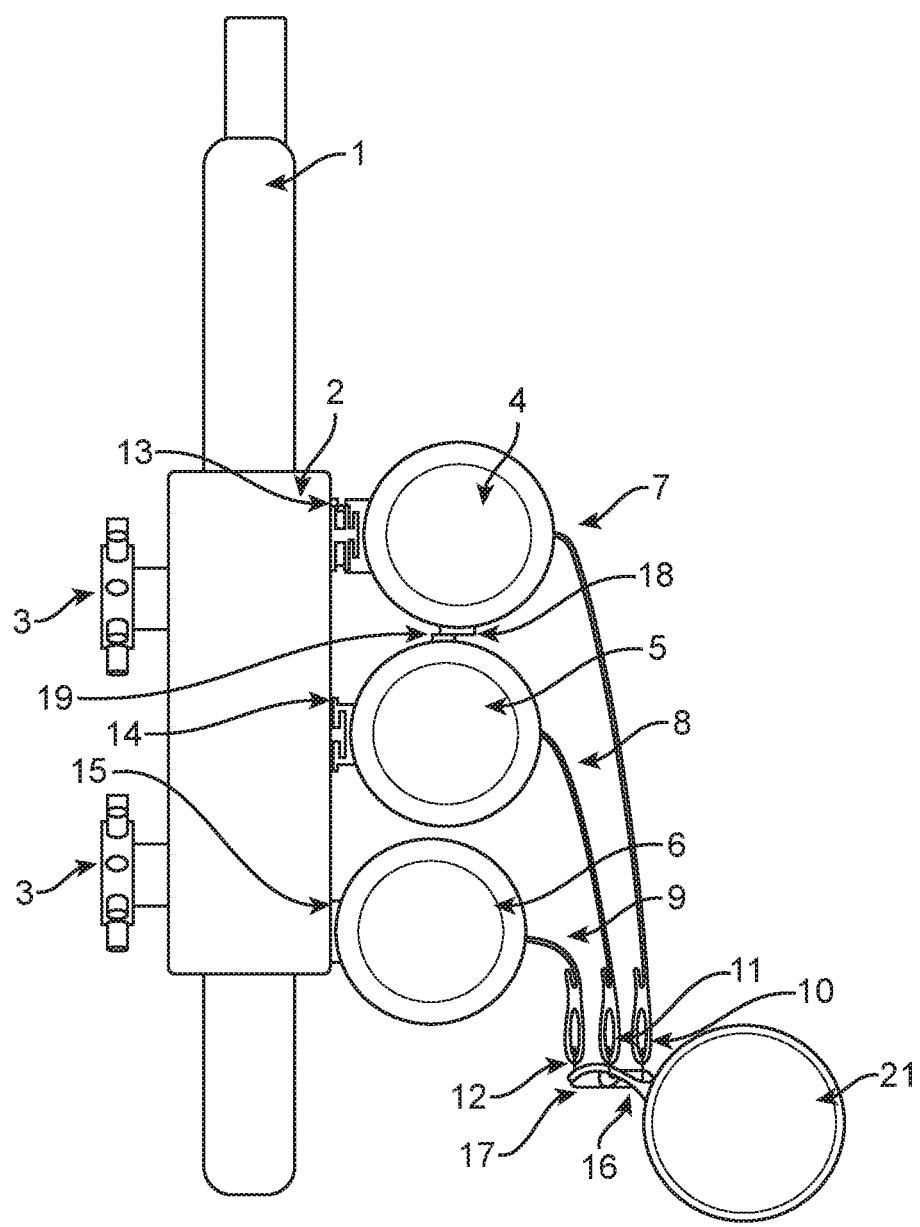
FIG. 7: A side view of the system.
Figure 8:
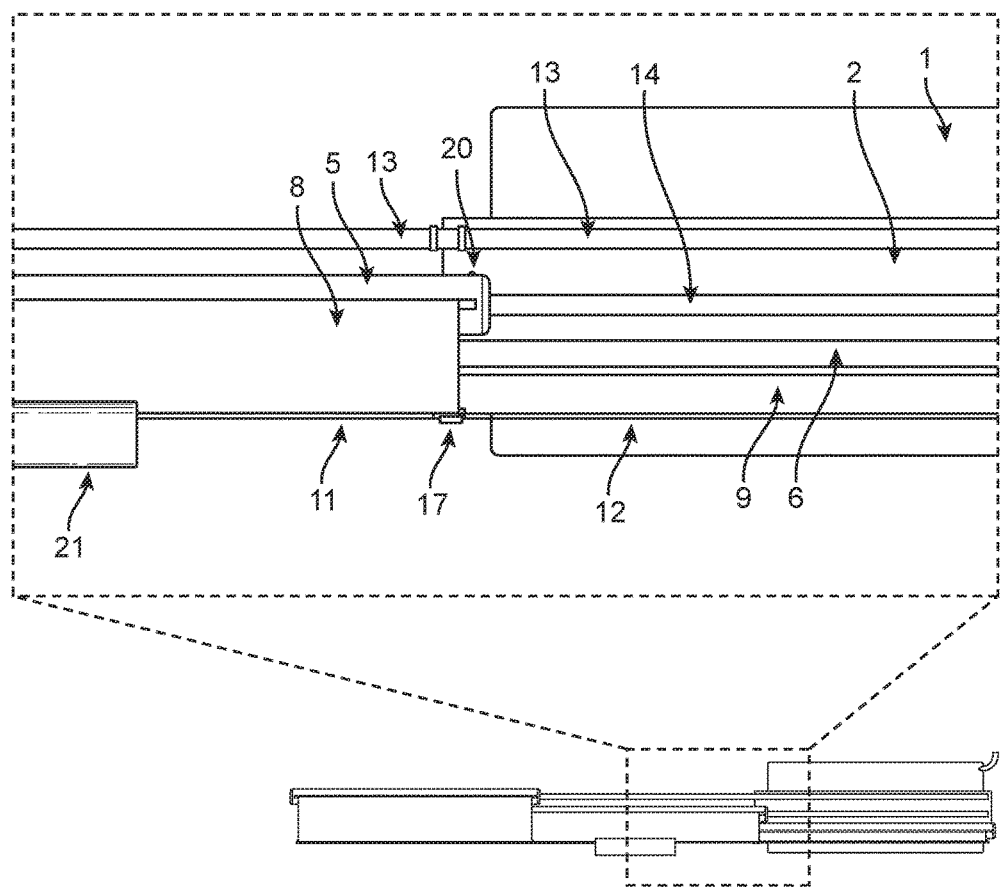
FIG. 8: A partial front view of the system (inside the vehicle) when fully and horizontally extended and partially deployed.
Figure 9:
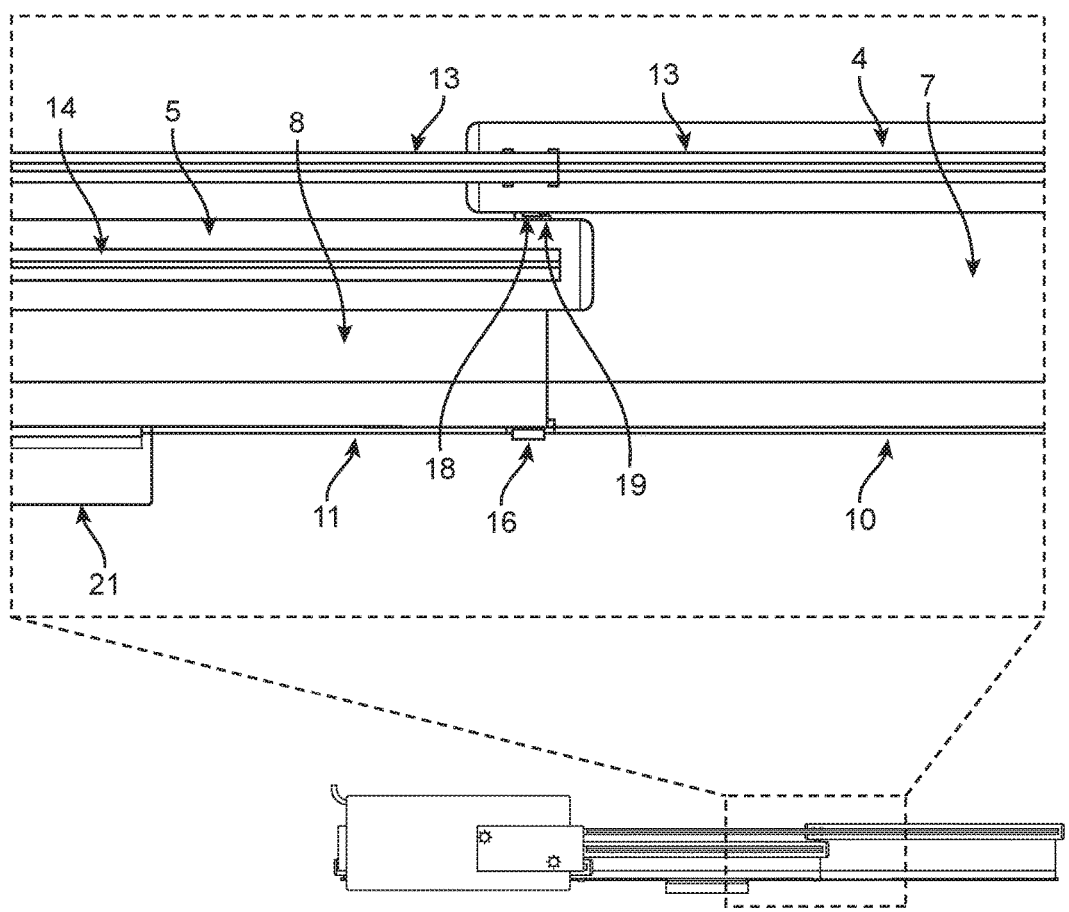
FIG. 9: A partial back view of the system (in front of the vehicle) when fully and horizontally extended and partially deployed.

FIG. 7 shows a profile view of base 2 mounted on sun visor 1. As can be seen more clearly, sun visors 7, 8, 9 are connected by their respective tail handles 10,11, 12, by rings 16, 17. Also more visible in FIG. 7 are triggers 18 and 19. FIG. 8 shows more clearly the interface between sun visor tube 5 and 6. Of particular interest are the two telescoping portions of slide rail 13. And while trigger 20 is shown in FIG. 8 from the front perspective of sun visor 1, triggers 18, 19 are shown in contact with each other as seen from the rear perspective of visor 1 in FIG. 9, showing full extension of sun visor tubes 4, 5.

Figure 10:
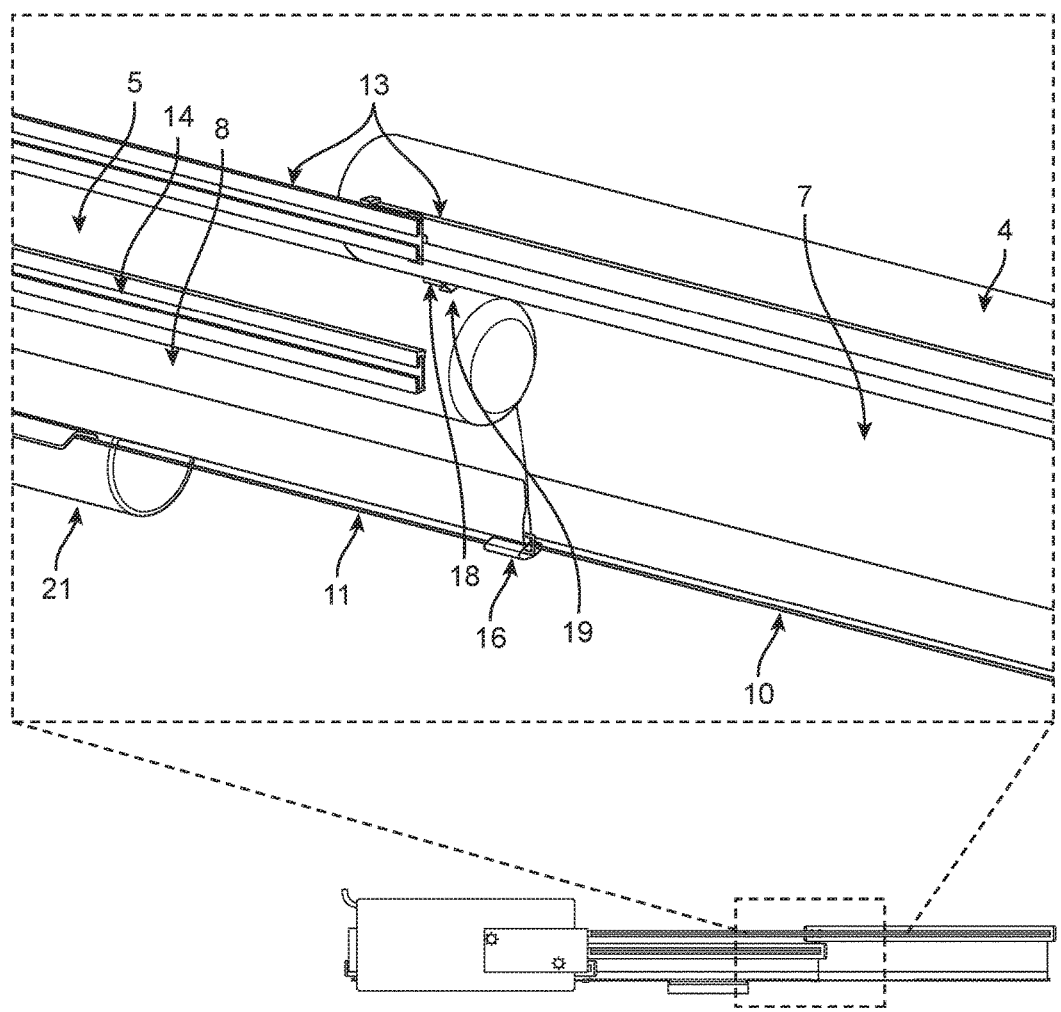
FIG. 10: A partial perspective view of the system when fully and horizontally extended and partially deployed.

FIG. 10 shows a partial perspective view of the system when fully and horizontally extended and partially deployed. Once again, sliding rail 13 is shown in multiple lengths, and sliding rail 14 only shows one portion as the remaining portion is out of view. Also of note here is ring 16 is more clearly seen connecting tail handles 10 and 11.

While a system and method for a two-pull windshield shade has been illustrated and described in detail, it is to be understood that numerous modifications can be made to embodiments of the present invention without departing from the spirit thereof.

What is claimed is:

1. A windshield shade, comprising:
a base, the base dimensioned to fit around an automobile sun visor and attaching thereto;
a first sun visor tube, the first sun visor tube connected to the base by a first telescopic slide rail and containing a first retractable sun visor;
a second sun visor tube, the second sun visor tube connected to the base by a second telescopic slide rail and containing a second retractable sun visor; and
a third sun visor tube, the third sun visor tube connected to the base and containing a third retractable sun visor;
wherein the second sun visor tube extends along the second telescopic slide rail linearly to distance from the automobile sun visor;
wherein the first sun visor tube extends along the first telescopic slide rail linearly to a distance beyond the second sun visor tube;
wherein the third sun visor tube remains in a static relationship with the automobile sun visor.

2. The windshield shade of claim 1, further comprising a counter weight, a first ring, and a second ring, wherein the second sun visor is connected to the counter weight, and the first ring connects the second sun visor tube to the first sun visor tube, and the second ring connects the second sun visor tube to the third sun visor tube.

3. The windshield shade of claim 2, wherein first sun visor has a first tail handle, the second sun visor has a second tail handle, and the third sun visor has a third tail handle.

4. The windshield shade of claim 3, wherein the counterweight is attached to the second tail handle.

5. The windshield shade of claim 3, wherein the second tail handle is connected to the first tail handle by a first ring.

6. The windshield shade of claim 3, wherein the second tail handle is connected to the third tail handle by a second ring.

7. The windshield shade of claim 1, wherein the first sun visor tube and second sun visor tube are engaged by a first trigger and a second trigger wherein when the first trigger and second trigger are brought into contact with each other the second sun visor tube is extended from the base along the second slide rail.

8. The windshield shade of claim 7, wherein the first sun visor tube and second sun visor tube are engaged by a third trigger such that when the third trigger is brought in contact with the first trigger, the second sun visor tube is retracted to the base along the second slide rail.

9. The windshield shade of claim 1, wherein the first telescopic rail has three sections.

10. The windshield shade of claim 1, wherein the second telescopic rail has two sections.

11. The windshield shade of claim 1, wherein the base includes at least one attachment screw, the attachment screw fastening the base to the automobile sun visor.

12. The windshield shade of claim 1, wherein the base is attached to the automobile sun visor on the passenger side of a vehicle.

13. The windshield shade of claim 1, wherein the first sun visor, second sun visor, and third sun visor are self-locking.

14. A method of deploying an automobile windshield shade comprising:
attaching to an automobile sun visor a base having first and second telescopic slide rails, and first, second, and third sun visor tubes, respectively containing a first retractable sun visor having a first tail handle extending along the length of the bottom edge of the first sun visor, a second retractable sun visor having a second tail handle extending along the length of the bottom edge of the second retractable sun visor, a third retractable sun visor having a third tail handle extending along the length of the bottom edge of the third retractable sun visor, wherein the first, second, and third tail handles are connected to each other by first and second rings, wherein the first ring connects the right end of the first tail handle with the left end of the second tail handle, and where the second ring connects the right end of the second tail handle to the left end of the third tail handle;
in a first motion, extending the first sun visor tube along the first telescopic slide rail, and the second sun visor tube along the second telescopic slide rail, away from the base to first and second extended positions, wherein the first sun visor tube engages and extends the second sun visor tube when the first sun visor tube is extended; and
in a second motion, extending the second retractable sun visor from the second sun visor tube, and, by connection by the first and second rings extending the first, second, and third retractable sun visors from the first, second and third sun visor tubes.

15. The method of claim 14, wherein extending the first sun visor tube brings into contact a first trigger on the first sun visor tube with a second trigger on the second sun visor tube, thus extending the second sun visor tube.

16. The method of claim 14, wherein extending the second retractable sun visor comprises grasping a counter weight attached to second tail handle and pulling it downward.

17. A method of retracting an automobile windshield shade comprising:

attaching to an automobile sun visor a base having first and second telescopic slide rails, and first, second, and third sun visor tubes, respectively containing a first retractable sun visor having a first tail handle extending along the length of the bottom edge of the first sun visor, a second retractable sun visor having a second tail handle extending along the length of the bottom edge of the second retractable sun visor, a third retractable sun visor having a third tail handle extending along the length of the bottom edge of the third retractable sun visor, wherein the first, second, and third tail handles are connected to each other by first and second rings, wherein the first ring connects the right end of the first tail handle with the left end of the second tail handle, and where the second ring connects the right end of the second tail handle to the left end of the third tail handle;

in a first motion, retracting the second retractable sun visor into the second sun visor tube, and, by connection by the first and second rings retracting the first, second, and third retractable sun visors into the first, second and third sun visor tubes; and in a second motion, retracting the first sun visor tube along the first telescopic slide rail, and the second sun visor tube along the second telescopic slide rail, to first and second retracted positions, wherein the first sun visor tube engages and retracts the second sun visor tube when the first sun visor tube is retracted.

18. The method of claim 17, wherein retracting the first sun visor tube brings into contact a first trigger on the first sun visor tube with a third trigger on the second sun visor tube and retracts the second sun visor tube to the base.

19. The method of claim 18, wherein extending the second retractable sun visor comprises unhooking the counter weight attached to second tail handle and releasing the second retractable sun visor.

* * * * *